United States Patent
Jibbe et al.

(10) Patent No.: US 8,601,210 B2
(45) Date of Patent: Dec. 3, 2013

(54) CACHE MEMORY ALLOCATION PROCESS BASED ON TCPIP NETWORK AND/OR STORAGE AREA NETWORK ARRAY PARAMETERS

(75) Inventors: Mahmoud K. Jibbe, Wichita, KS (US); Madhukar Gunjan Chakhaiyar, Bihar (IN); Himanshu Dwivedi, Bangalore (IN)

(73) Assignee: LSI Corporation, San Jose, CA (US)

( * ) Notice: Subject to any disclaimer, the term of this patent is extended or adjusted under 35 U.S.C. 154(b) by 322 days.

(21) Appl. No.: 13/073,045

(22) Filed: Mar. 28, 2011

(65) Prior Publication Data
US 2012/0254533 A1 Oct. 4, 2012

(51) Int. Cl.
*G06F 12/00* (2006.01)
(52) U.S. Cl.
USPC .......................................................... 711/114
(58) Field of Classification Search
None
See application file for complete search history.

(56) References Cited

U.S. PATENT DOCUMENTS

| | | | |
|---|---|---|---|
| 6,434,608 B1 * | 8/2002 | Desai | 709/217 |
| 7,213,087 B1 * | 5/2007 | Bertone et al. | 710/56 |
| 2005/0076115 A1 | 4/2005 | Andrews et al. | 709/224 |
| 2006/0004957 A1 | 1/2006 | Hand, III et al. | 711/113 |
| 2009/0182836 A1 * | 7/2009 | Aviles et al. | 709/213 |
| 2010/0017568 A1 * | 1/2010 | Wadhawan et al. | 711/129 |
| 2011/0099344 A1 * | 4/2011 | Browne et al. | 711/162 |

\* cited by examiner

*Primary Examiner* — Duc Doan
(74) *Attorney, Agent, or Firm* — Christopher P. Maiorana, PC

(57) ABSTRACT

An apparatus comprising a controller, one or more host devices and one or more storage devices. The controller may be configured to store and/or retrieve data in response to one or more input/output requests. The one or more host devices may be configured to present the input/output requests. The one or more storage devices may be configured to store and/or retrieve the data. The controller may include a cache memory configured to store the input/output requests. The cache memory may be configured as a memory allocation table to store and/or retrieve a compressed version of a portion of the data in response to one or more network parameters. The compressed version may be retrieved from the memory allocation table instead of the storage devices based on the input/output requests to improve overall storage throughput.

16 Claims, 11 Drawing Sheets

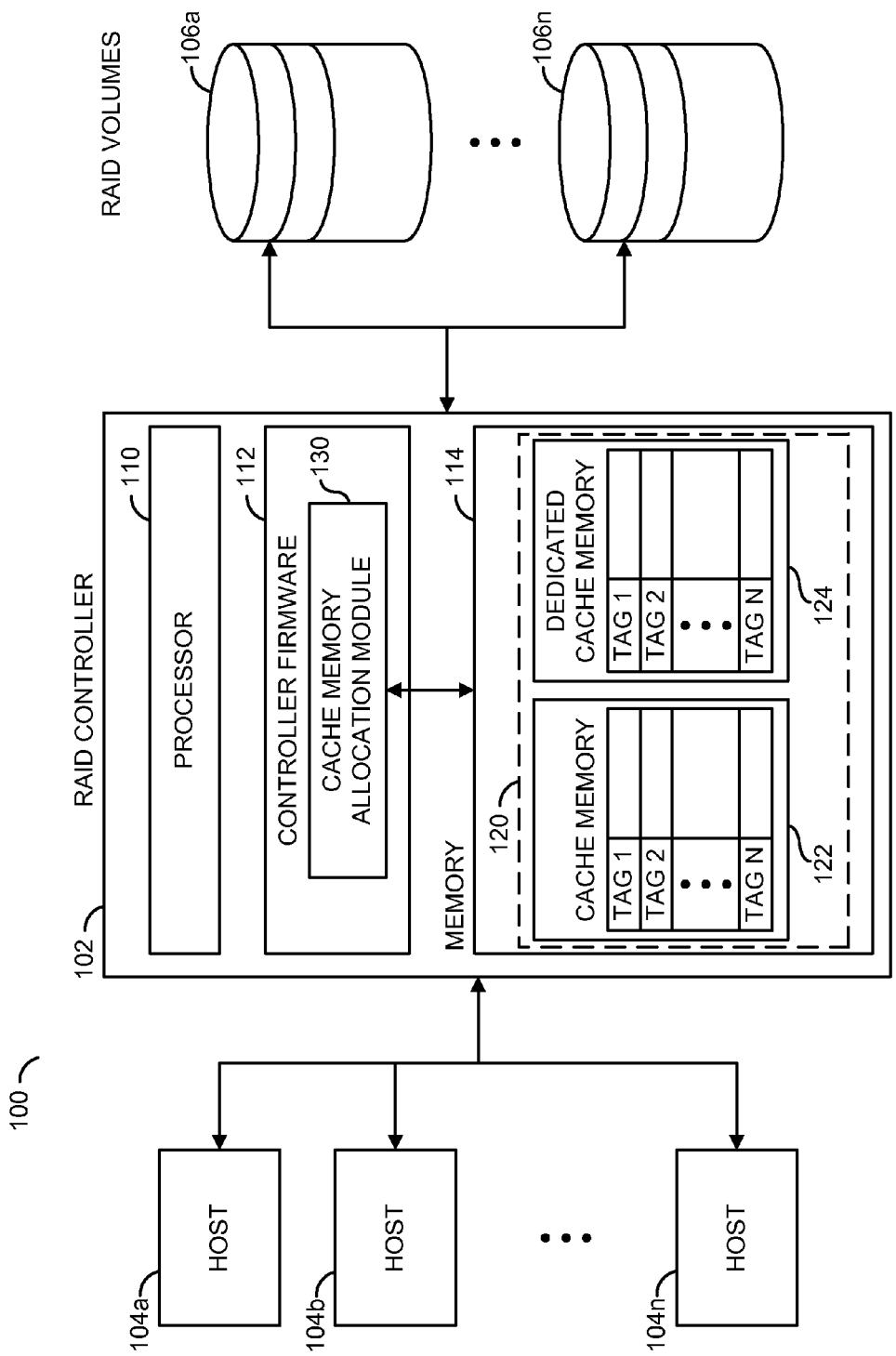

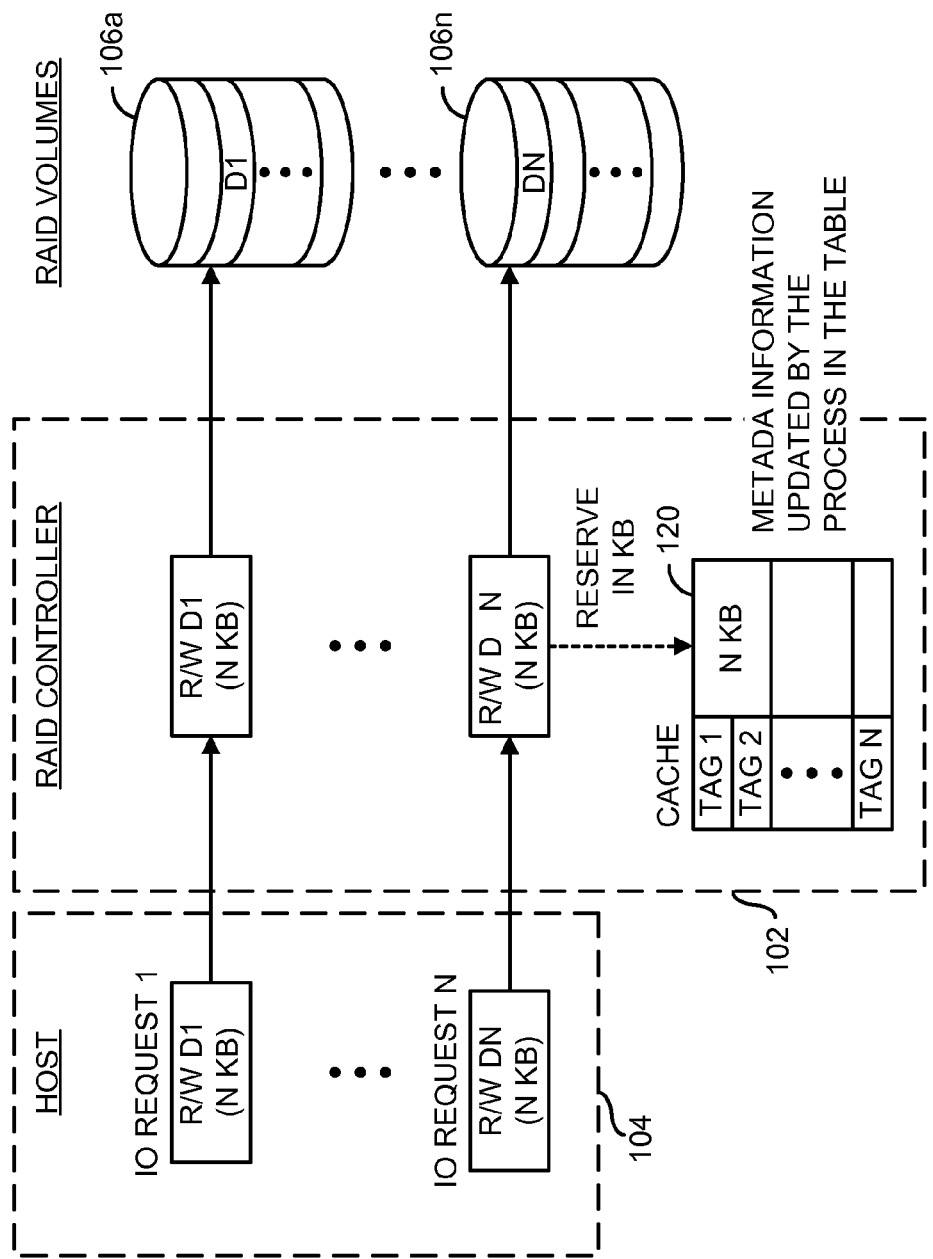

CACHE MEMORY ALLOCATION PROCESS BASED ON TCPIP NETWORK AND/OR STORAGE AREA NETWORK ARRAY PARAMETERS

FIELD OF THE INVENTION

The present invention relates to data storage generally and, more particularly, to a method and/or apparatus for implementing a cache memory allocation process based on TCP/IP network and/or storage area network array parameters.

BACKGROUND OF THE INVENTION

Conventional data centers and cloud computing environments demand increased I/O performance to support large-scale applications such as databases, web servers, e-commerce applications, file servers, and/or email. These applications are frequently implemented on Transmission Control Protocol and Internet Protocol (TCP/IP) networks and/or a Storage Array Network (SAN). Faster access of data is difficult because several transmissions and re-transmissions of data can cause packet drops, which are more prone to error due to network congestion and increased Local Area Network (LAN) utilization. Dropped packets and latency in a saturated network significantly increases the data access time for data requests sent out from a server. The data packet loss and/or several re-transmissions create an additional overhead to the network bandwidth. This problem can also increase array controller load, network load, and average data transfer latency.

It would be desirable to implement a cache memory allocation process based on TCP/IP network and/or SAN array parameters.

SUMMARY OF THE INVENTION

The present invention concerns an apparatus comprising a controller, one or more host devices and one or more storage devices. The controller may be configured to store and/or retrieve data in response to one or more input/output requests. The one or more host devices may be configured to present the input/output requests. The one or more storage devices may be configured to store and/or retrieve the data. The controller may include a cache memory configured to store the input/output requests. The cache memory may be configured as a memory allocation table to store and/or retrieve a compressed version of a portion of the data in response to one or more network parameters. The compressed version may be retrieved from the memory allocation table instead of the storage devices based on the input/output requests to improve overall storage throughput.

The objects, features and advantages of the present invention include providing cache memory allocation process that may (i) be based on TCP/IP network and/or storage area network array parameters, (ii) provide enhancement of I/O performance and/or throughput, (iii) optimize controller instruction execution cycle (e.g., reduce the time taken to fetch data from a physical disk and/or decrease read/write latency), (iv) implement a cache memory allocation table with metadata information, (v) reduce the burden of data searches in RAID volumes, (vi) remove cache tagging and/or metadata information associated with I/O data from the cache memory allocation table if a data access request is not received within a predetermined time interval, (vii) save cache memory space, (viii) reduce network bandwidth overload, (ix) reduce I/O errors, data packet damage, and/or data packet loss, (x) compress data images and/or store the compressed data on cache, (xi) provide faster and/or quicker access of data and/or (xii) improve I/O performance.

BRIEF DESCRIPTION OF THE DRAWINGS

These and other objects, features and advantages of the present invention will be apparent from the following detailed description and the appended claims and drawings in which:

FIG. 1 is a diagram illustrating an embodiment of the present invention;

FIG. 3 is a diagram illustrating a fixed length block access;

DETAILED DESCRIPTION OF THE PREFERRED EMBODIMENTS

Figure 2A:
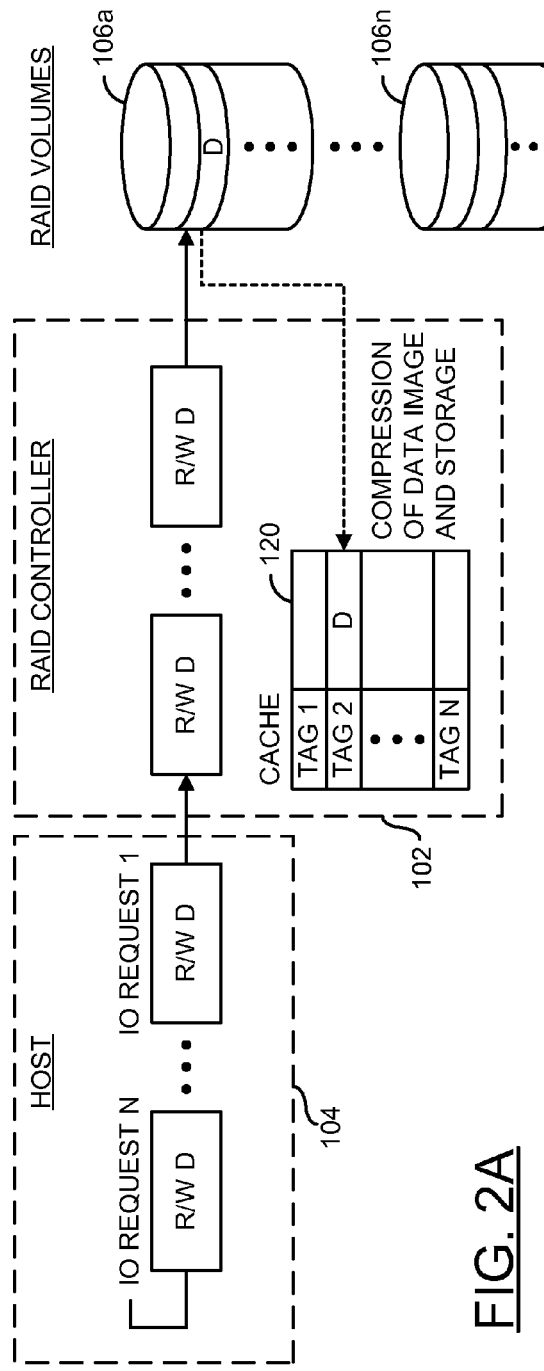
FIGS. 2A-B are diagrams illustrating a data block access.

Data center operators and/or cloud applications are continuously challenged to improve Storage Area Network (SAN) array performance to keep up with the demands of high-throughput applications and/or growing user bases. The present invention may provide a cache memory allocation process to improve input/output (I/O) performance based on data access patterns, Transmission Control Protocol and the Internet Protocol (TCP/IP) network parameters and/or array I/O timeout properties. A Redundant Array of Independent Disks (RAID) controller may be equipped with a cache memory. The cache memory in the RAID controller may enhance read and/or write performance, to improve overall storage throughput. By maintaining the cache memory allocation table, the metadata information for input/output data with other table components may be stored into the cache. Storing the metadata and/or other table components may accelerate read and/or write performance by allocating/dedicating cache memory. SAN array controller firmware or a dedicated application may implement a cache memory allocation module to maintain the metadata information. The metadata information may be computed statistically based on suggested rules/policies of a cache memory allocation process.

Referring to FIG. 1, a block diagram of a system 100 is shown in accordance with a preferred embodiment of the present invention. The system 100 generally comprises a block (or circuit) 102, a number of blocks (or circuits) 104a-104n and a number of blocks (or circuits) 106a-106n. The block 102 may be implemented as a controller. In one example, the block 102 may be implemented as a RAID controller. The blocks 104a-104n may be implemented as one or more host computers. The blocks 106a-106n may be implemented as one or more volumes. In one example, the blocks 106a-106n may be implemented as one or more RAID volumes.

The controller 102 generally comprises a block (or circuit) 110, a block (or circuit) 112 and a block (or circuit) 114. The block 110 may be implemented as a processor. The block 112 may be implemented as a controller firmware block (or module). The block 114 may be implemented as a memory circuit. The memory 114 generally comprises a block (or circuit) 120, a block (or circuit) 122 and a block (or circuit) 124. The circuit 120 may be implemented as a cache memory allocation table. The circuit 120 may comprise the circuit 122 and the circuit 124. The circuit 122 may be implemented as a cache memory. The circuit 124 may be implemented as a dedicated cache memory. The controller firmware 112 may include a cache memory allocation module 130.

The controller 102 may cache metadata information with various conditions/parameters defined for a cache memory allocation process. The cache memory 122 and the dedicated cache memory 124 may be used for multiple purposes (e.g., caching read/write data, etc.). The administration of the cache memory 114 on the controller 102 may be implemented by the cache memory allocation module 130. The module 130 may be part of controller firmware 112 or may be implemented as a dedicated application. To maintain an input/output data record and/or metadata information, the cache memory allocation table 120 may be maintained under the guidance of the cache memory allocation module 130. The following TABLE 1 illustrates an example of the cache memory allocation table 120:

TABLE 1

| Cache memory Tag | Timestamp | Metadata(e.g.- Tray ID, Drive No., LBA) | Associated data metadata(e.g.- Tray ID, Drive No., LBA) | Type of the data (e.g. - Frequent, Fixed length, variable length) | Size of the data |
|---|---|---|---|---|---|
| 1 | xx:yy | 2, 12, 0x00000000 | 3, 09, 0x00000008 | Frequent | 1 byte |

The cache memory allocation module 130 may oversee data processed in the system 100. The module 130 may maintain a table of each data I/O request frequency, metadata of I/O data which may contain an initial address, associated data metadata, a timestamp of each I/O request and/or tagging of the data (e.g., a cache memory tag number defined by the cache memory allocation module 130 and/or the size of the data). Once an I/O request is received by the controller 102, the cache memory allocation module 130 may become active. The module 130 may then serve the request by comparing values in the table 120. If the cache memory allocation module 130 finds the requested data in the table 120, data may be fetched from the table 120 instead of searching in the RAID volumes 106a-106n.

The cache memory allocation module 130 in the RAID controller firmware 112 may periodically manage the table and/or examine data packets based upon a parameter. The parameter may include one or more of (i) a data access pattern, (ii) a network parameter (e.g., average round trip time of packets and/or network bandwidth), (iii) host/initiator response time (e.g., time out values), (iv) storage array controller response time (e.g., time out values), and/or (v) a re-transmission value of the data packets due to packet drops over a TCP/IP network. The parameter may be weighed against the data packet passing through the system 100. The cache memory allocation module 130 may track the data packet, evaluate the data packets based on defined parameters and/or serve requests from the cache memory 122 and the cache memory 124.

Performance of the data access over a TCP/IP network may be improved by performing (i) analysis of data access patterns associated with each data packet from the controller 102 or hosts 104a-104n, (ii) an examination of each data pattern comprising evaluating the frequency and type of particular data been accessed and/or (iii) classification of the data access patterns into applications, such as regular data access patterns.

Figure 2B:
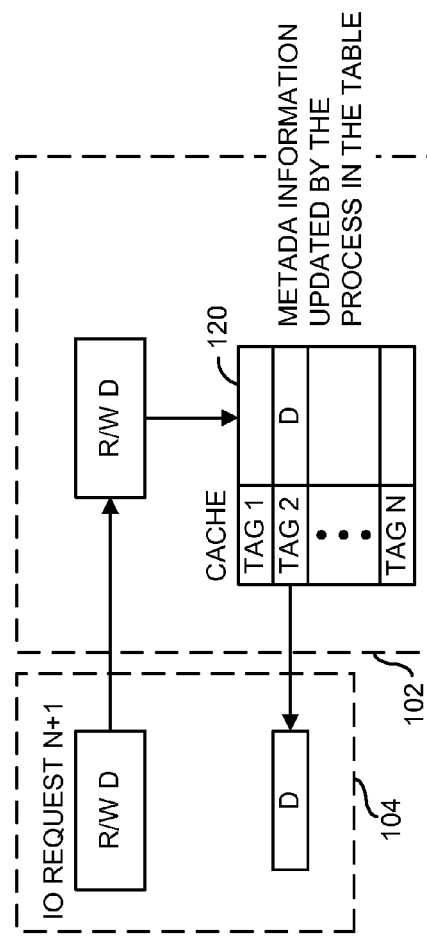

Referring to FIGS. 2A-B, diagrams illustrating frequently accessed data blocks are shown. As shown in FIG. 2A, a lookup into the timestamp in the cache memory allocation table 120 by the cache memory allocation module 130 may determine whether the data (e.g., R/W D) is frequently accessed. In such a condition, the cache memory allocation module 130 may update the tags and/or the data and metadata information for particular data. An image of the data may be stored in the cache 122 and/or the cache 124. The image may be a compressed version of a portion of the data. The data may be stored in an allocated memory location (e.g., cache 122 and/or cache 124) after compression. As shown in FIG. 2B, if one of the hosts 104a-104n accesses the same data repeatedly from the RAID volume 106a-106n, the efficient use of compression of the image and then caching data may save cache space and/or improve throughput. The compressed version of data may be retrieved from the memory allocation table 120 if a compressed version is available in the memory allocation table 120. The RAID controller 102 may be accessed in order to load the image into the cache 122 and/or the cache 124. Data may also be accessed repeatedly from the cache 122 and/or the cache 124 without impact on the controller 102. The compressed version of data may be retrieved from the memory allocation table 120 instead of the volumes 106a-106n to improve throughput.

Referring to FIG. 3, a diagram illustrating fixed length block accesses is shown. The same size data access request (e.g., R/W D1-R/W DN) may be received in consecutive references. The data may comprise a fixed length pattern. The fixed length pattern may be found in the information stored in the cache memory allocation table 120. To increase the throughput, the cache memory allocation module 130 may update the table 120 and components in the table 120 (e.g., metadata, type and/or size of the data, etc.). The cache memory allocation module 130 may also reserve a fixed cache size that is equivalent to a fixed requested data block length. If a similar size data access request is received in consecutive references, the cache memory allocation table 120 may be used to determine the metadata of the data with associated data metadata. The table 120 may also determine the assignment of fixed cache size to implement the I/O request faster. This may reduce the burden on the RAID controller 102 by decreasing the execution cycle for each I/O request and/or allowing other tasks to run parallel on the controller 102.

Figure 4:
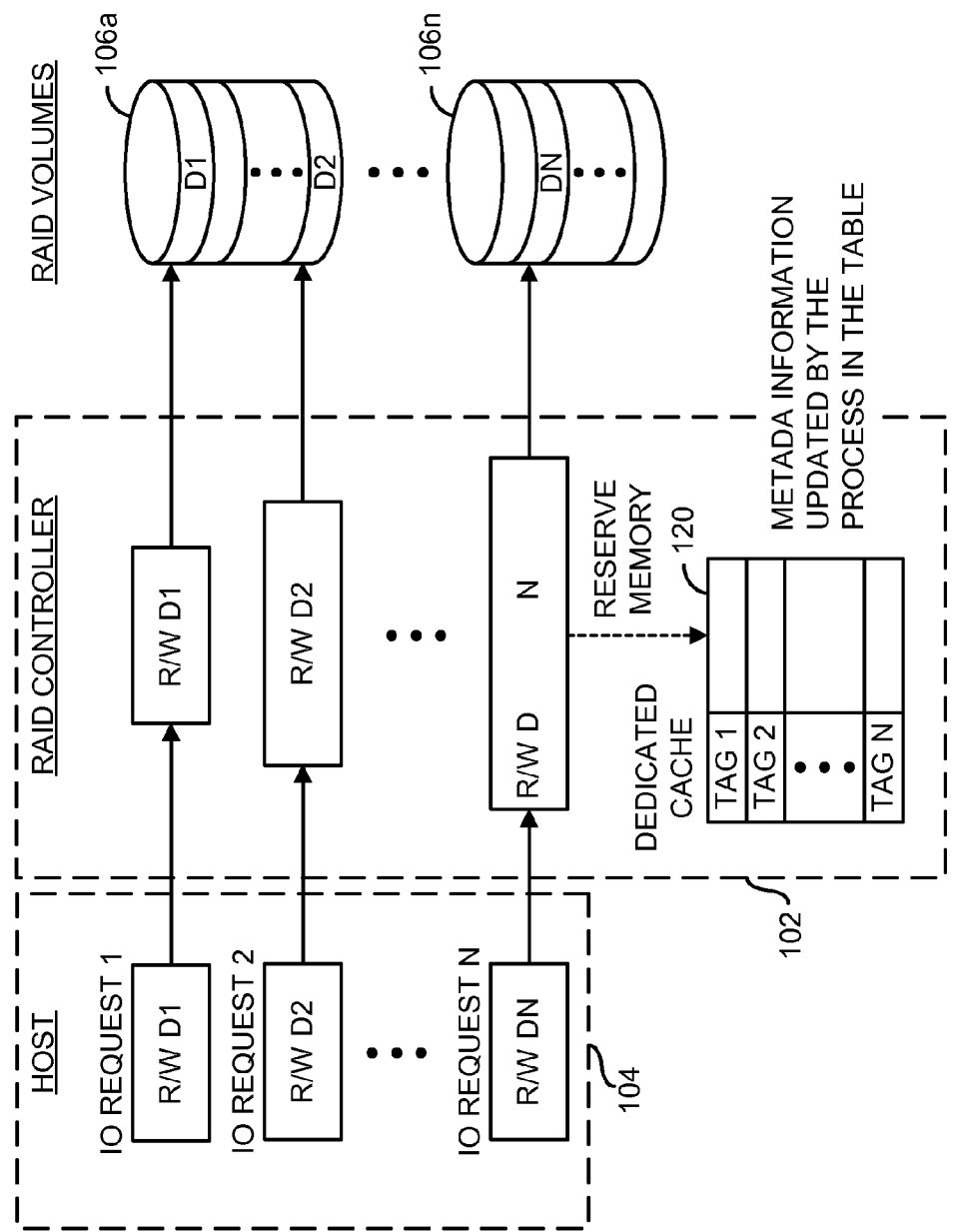
FIG. 4 is a diagram illustrating a variable length data access.

Referring to FIG. 4, a diagram illustrating a variable length data access is shown. A data block size of a next reference (e.g., R/W D2) may be dissimilar to the size of a currently accessed data block size (e.g., R/W D1). To achieve higher I/O bandwidth, the cache 124 may be implemented in parallel to the cache 122 on the controller 102. The cache 124 may serve as a variable length data storage archive to deliver constant high throughput and/or to manage multiple I/O requests in parallel.

Figure 5:
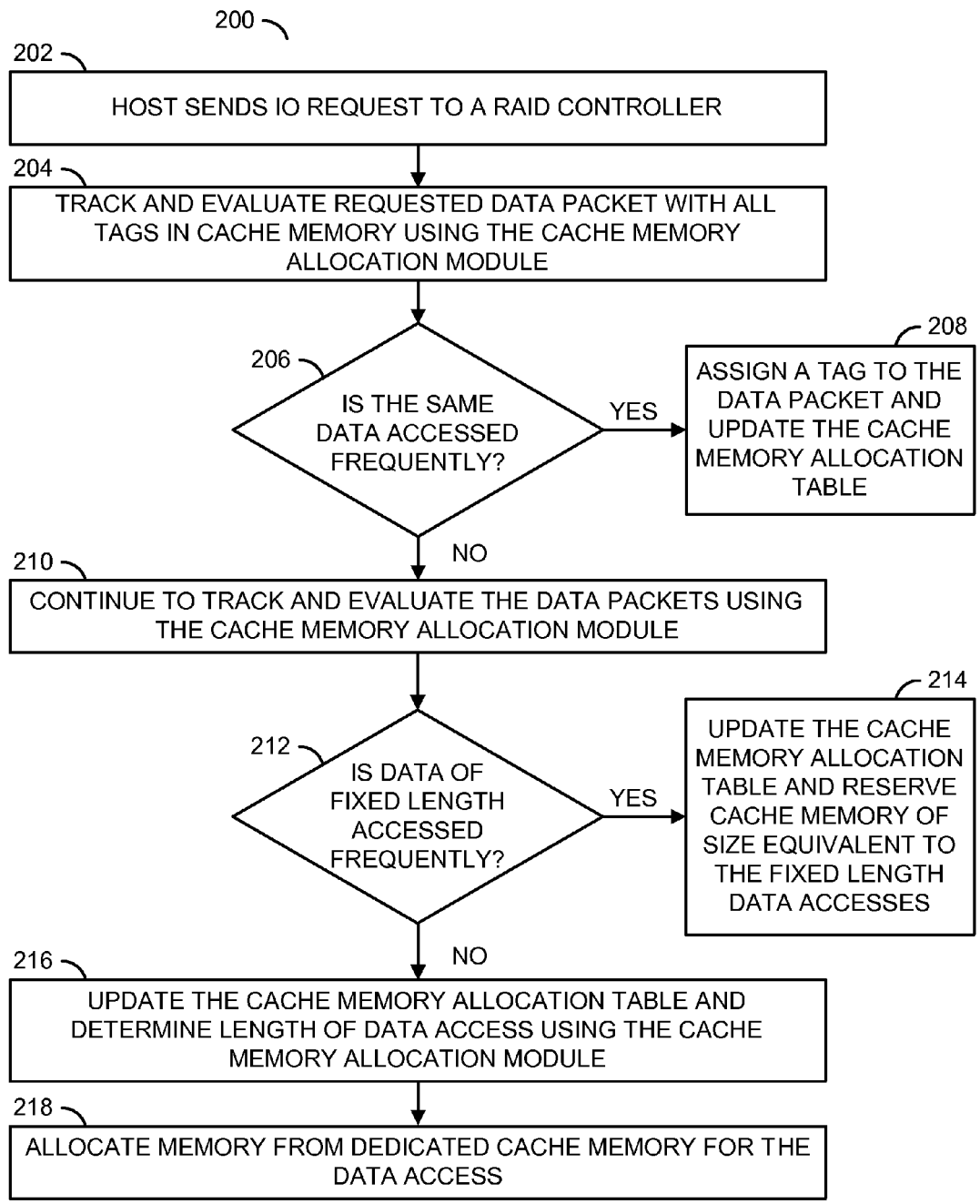
FIG. 5 is a flow diagram illustrating a cache memory allocation.

Referring to FIG. 5, a flow diagram illustrating a method (or process) 200 for analysis of data access patterns using the cache memory allocation module 130 is shown. The method 200 generally comprises a step (or state) 202, a step (or state) 204, a decision step (or sate) 206, a step (or state) 208, a step (or state) 210, a decision step (or state) 212, a step (or state) 214, a step (or state) 216 and a step (or state) 218.

In the step 202, one of the hosts 104a-104n may send an I/O request to the RAID controller 102. At the step 204, the address of the requested data packet may be compared with all of the tags in the cache memory 122 and/or cache memory 124. The step 206 may check whether the same data packet is accessed frequently. If so, the method 200 moves to the step 208. In the step 208, a tag may be assigned to the data packet and the cache memory allocation table 120 may be updated. If the same data packet is not accessed frequently, the method 200 moves to the step 210. In the step 210, the cache memory allocation module 130 may continue to track and evaluate the data packets. Next, the method 200 moves to the step 212. The step 212 may check whether fixed length data packets are accessed. If so, the method 200 moves to the step 214. In the step 214, the method 200 may update the cache memory allocation table 120 and a cache memory size equivalent to the fixed length data access may be reserved in the cache memory 122. If not, the method 200 moves to the step 216. In the step 216, the cache memory allocation table 120 may be updated and the length of the data packet accessed may be determined. Next, the method 200 moves to the step 218. In the step 218, the cache memory from the dedicated cache 124 may be allocated for the variable length data accesses.

Metadata, cache tagging metadata information and/or a particular I/O data entry from the cache memory allocation table 130 may be removed from the table 120 if the data access request are not received from the host 104 within a particular time interval. In one example, for a frequent data access pattern, if any data is accessed frequently during a first certain time interval, and afterwards the controller 102 does not receive an I/O request for a second time interval, then the cache memory allocation module 130 may remove the entry (e.g., the tag and metadata information associated to the data). This may save the cache memory 122 and/or the cache memory 124 space and allow the cache memory 122 and/or cache memory 124 to store additional I/O entry data.

Caching of data may be based on measurable parameters of the system 100, such as average round trip time (RTT) of data packets and/or data access time from a physical drive. The round trip time is the length of time it takes for a signal to be sent plus the length of time it takes for an acknowledgment of that signal to be received over the TCP connection. The congestion in network bandwidth generally increases the round trip time of data packet and/or unnecessary data re-transmissions that occur constantly, resulting in decreased throughput. Disk revolution per minute (RPM) may also affect hard drive performance because RPM directly impacts the latency and the data transfer rate of data. A lower RPM may impact the average round trip time of data packet. A low RPM may also increase the data access.

Figure 6A:
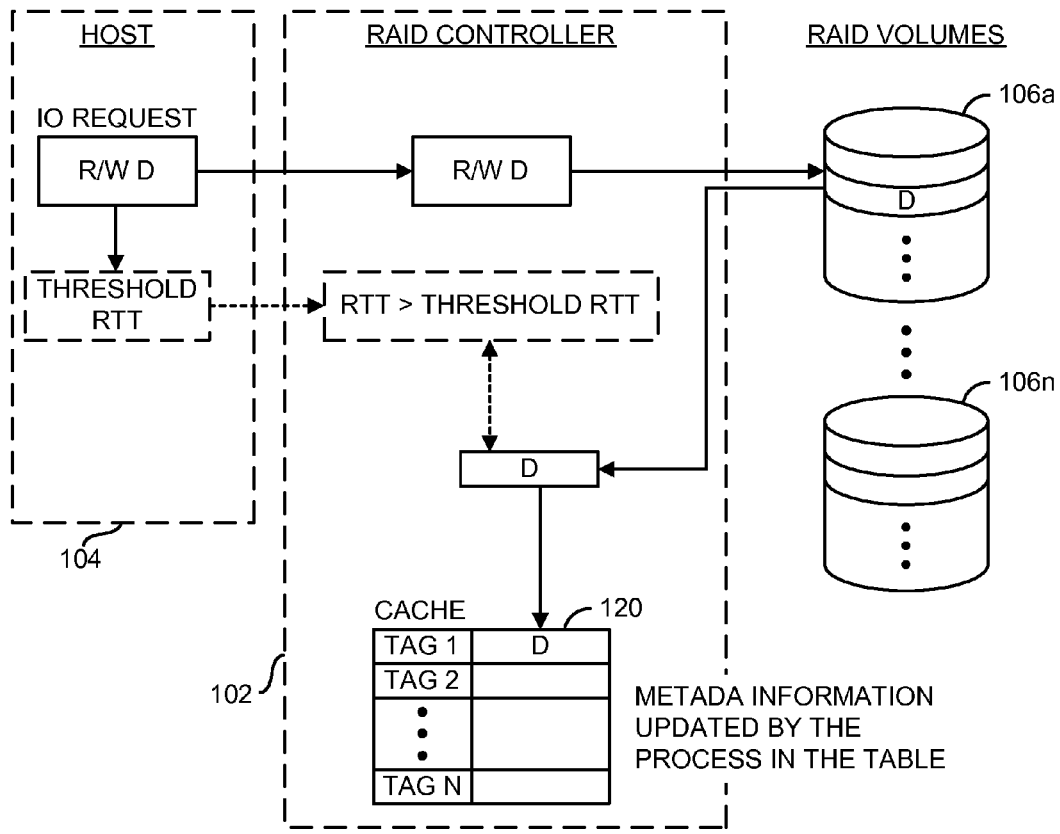
FIGS. 6A-B are diagrams illustrating a cache memory allocation.
Figure 6B:
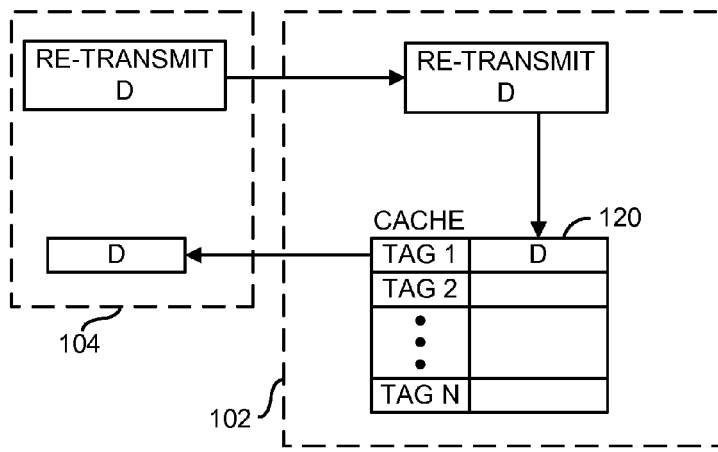

Referring to FIGS. 6A-B, diagrams illustrating a cache memory allocation for data based on the round trip time of the data packets are shown. As shown in FIG. 6A, if the round trip time of the data packet is greater than the threshold round trip time of a data packet over network, the particular data packet may be tagged and the cache memory allocation table 102 may update the metadata information and/or other components in the table 120. As shown in FIG. 6B, cache memory tagging of a data packet may be implemented when data packet requests are unable to meet the round trip time and re-transmission is requested. The RAID controller 102 may fetch the metadata of the data packet by using the table 120. The allocation of cache or storing the image onto the cache 122 and/or the cache 124 may follow the same data access patterns technique proposed in FIG. 5 to decrease the data retrieval time from the RAID volume and/or to service the re-transmission within the round trip time. The image may be a compressed version of a portion of the data packet. The compressed version of the data packet may be retrieved from the memory allocation table 120 instead of the RAID volumes 106a-106n if the compressed version of the data packet is available in the table 120.

Figure 7:
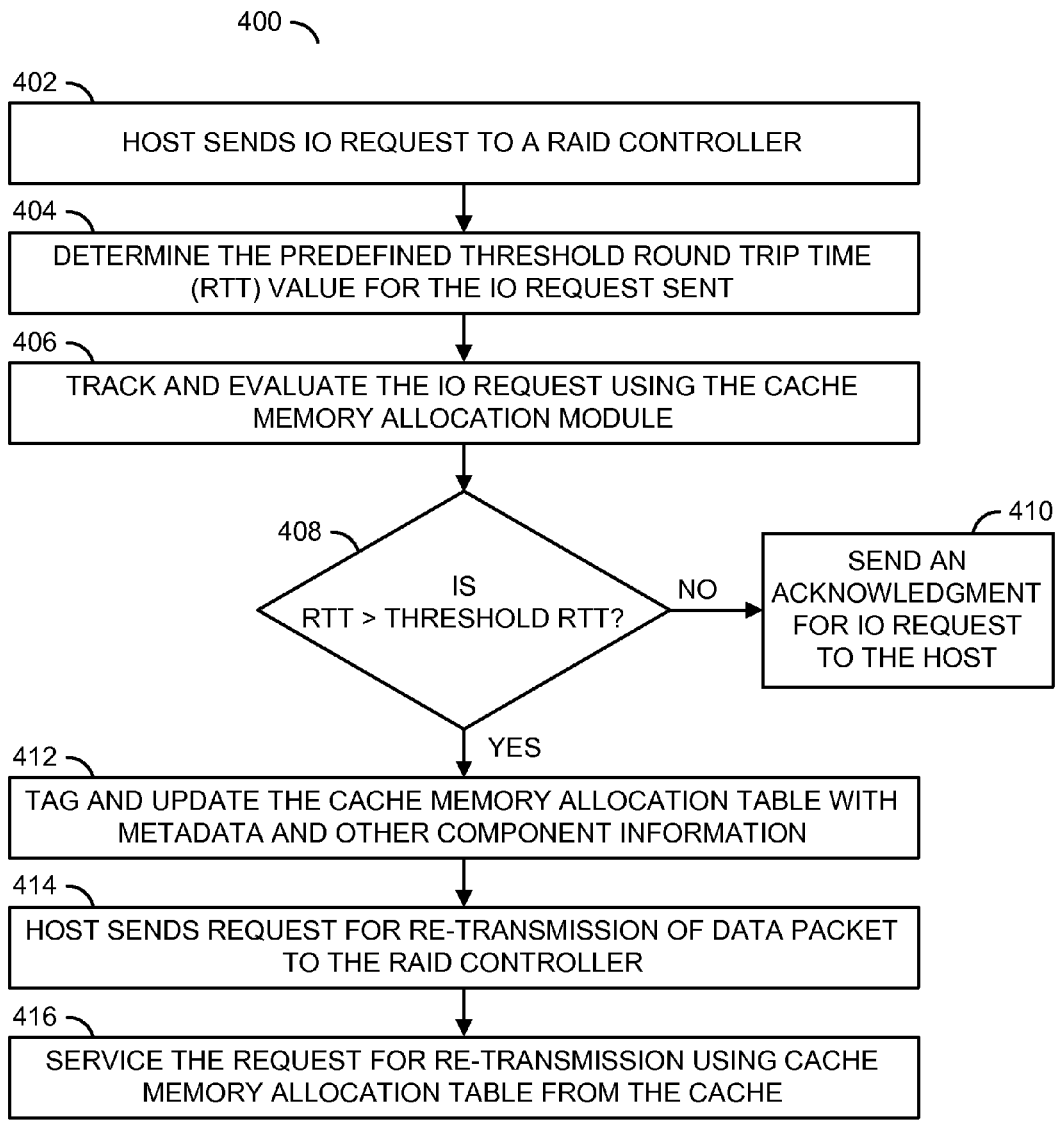
FIG. 7 is a flow diagram of a process for caching data.

Referring to FIG. 7, a diagram of a method (or process) 400 is shown illustrating caching of data based on measurable parameters of the network, such as round trip time. The method 400 generally comprises a step (or state) 402, a step (or state) 404, a step (or state) 406, a decision step (or state) 408, a step (or state) 410, a step (or state) 412, a step (or state) 414 and a step (or state) 416.

At the step 402, one of the hosts 104a-104n may send an I/O request to the RAID controller 102. At the step 404, a predefined threshold RTT value for the I/O request may be determined. At the step 406, accessed data packets may be tracked and evaluated by the cache memory allocation module 130. Next, the decision step 408 may check whether the RTT for the I/O request is greater than the threshold RTT. If not, the method 400 moves to the step 410. In the step 410, an acknowledgment for the I/O request may be sent to the host 104a-104n. If so, the method 400 moves to the step 412. In the step 412, the method 400 may tag and update the cache memory allocation table 120 with metadata and/or other component information. Next, in the step 414, the host 104a-104n may send a request for the re-transmission of the data packet. At step 416, the request for re-transmission may be serviced using the cache memory allocation table 120.

Figure 8A:
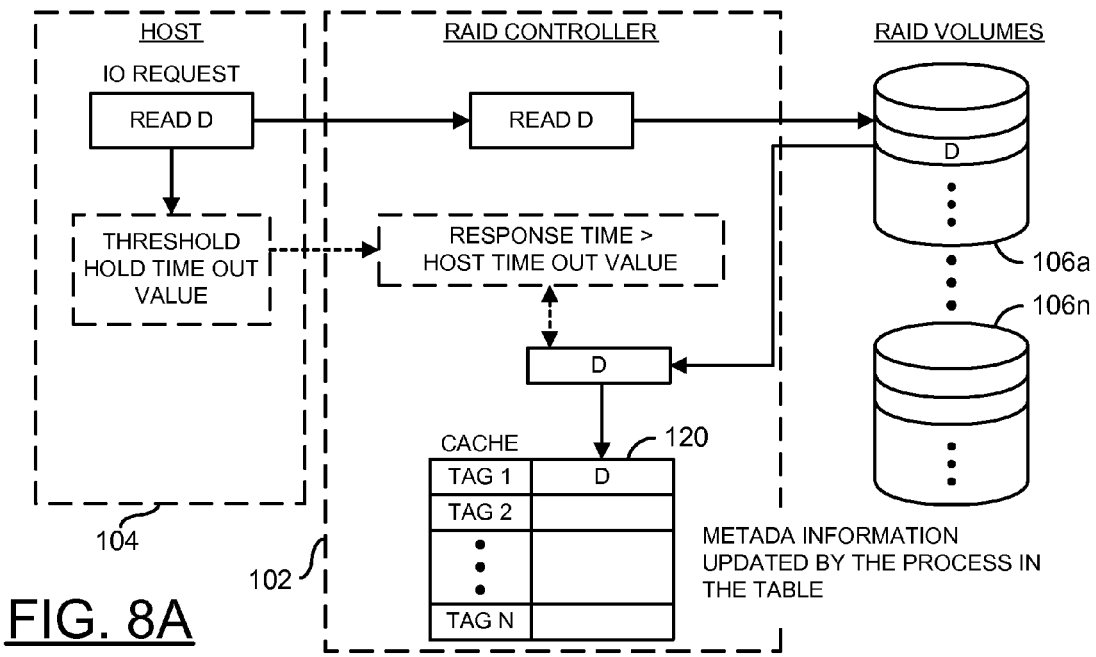
FIGS. 8A-C are diagrams illustrating a predefined host timeout value.
Figure 8B:
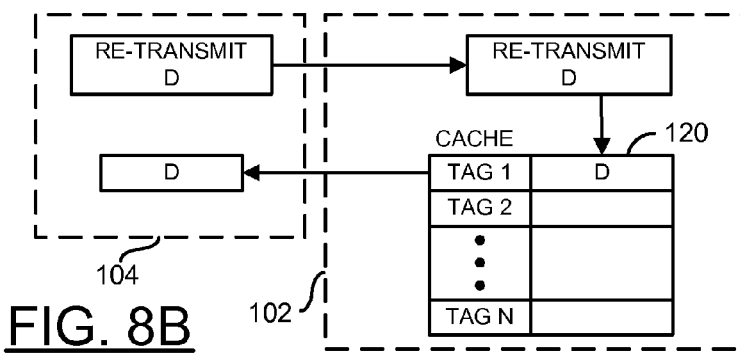
Figure 8C:
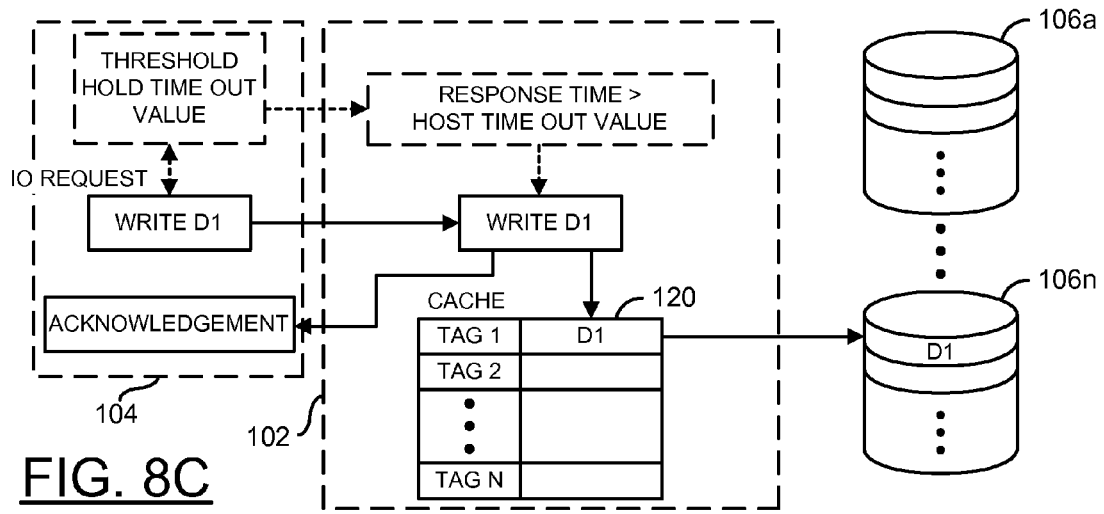

As shown in FIGS. 8A-C, a predefined host timeout value (e.g., port down retry timeout value, disk timeout value, host bus adapter (HBA) timeout value, etc.) may be defined to acquire the data within a particular time frame. As shown in FIGS. 8A and 8C, if the response time of an array module is greater than a host timeout value, the particular data packet may be tagged in cache memory allocation table 120 and cache memory allocation to serve the subsequent re-transmission of the same data if requested by the host 104. As shown in FIG. 83, if the array queue depth (e.g., the number of input/outputs a storage array may handle) is exhausted, the cache memory allocation module 130 may store the data on the cache 122 and/or the cache 124 to serve subsequent re-transmissions of the same data. The allocation of cache and/or storing the image onto cache generally follows similar data access patterns technique described in connection with FIG. 5.

Figure 9:
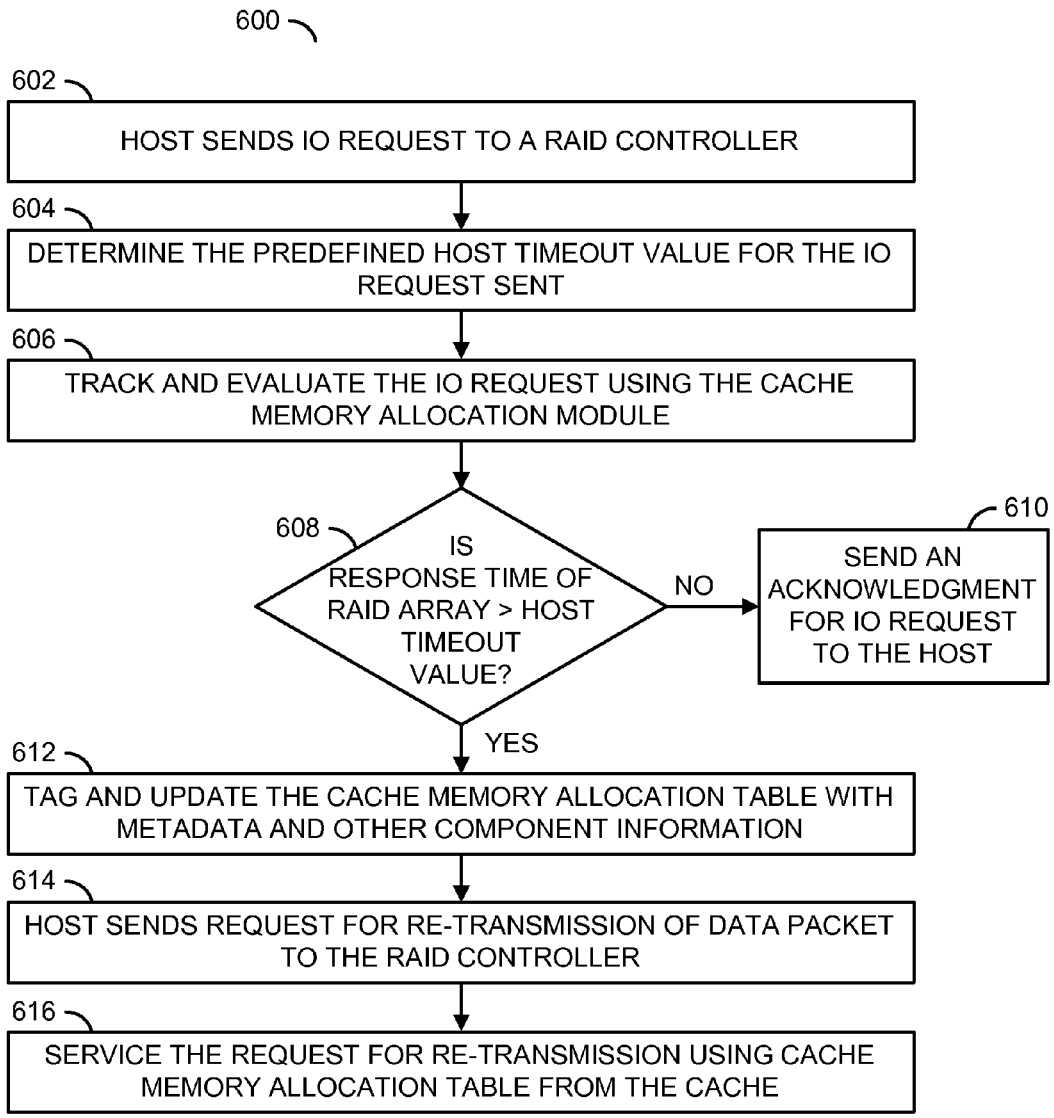
FIG. 9 is a flow diagram illustrating a method for caching.

Referring to FIG. 9, a diagram of a method (or process) 600 is shown illustrating caching of data based on measurable parameters (e.g., host time out value) of the system 100. The method 600 generally comprises a step (or state) 602, a step (or state) 604, a step (or state) 606, a decision step (or state) 608, a step (or state) 610, a step (or state) 612, a step (or state) 614 and a step (or state) 616.

In the step 602, one of the hosts 104a-104n may send an I/O request to the RAID controller 102. In the step 604, a predefined threshold host time out value for the I/O request may be determined. In the step 606, the data packets accessed may be tracked and evaluated by the cache memory allocation module 130. Next, the decision step 608 may check whether the response time of the RAID array 106a-106n is greater than the host time out value. If not, an acknowledgment may be sent to the host 104 at the step 610. If so, the method 600 moves to the step 612. The step 612 may tag and update the cache memory allocation table 120 with metadata and/or other component information. In the step 614, the host 104 may send a request for the re-transmission of the data packet. In step 616, the request for re-transmission may be serviced using the cache memory allocation table 120.

Figure 10A:
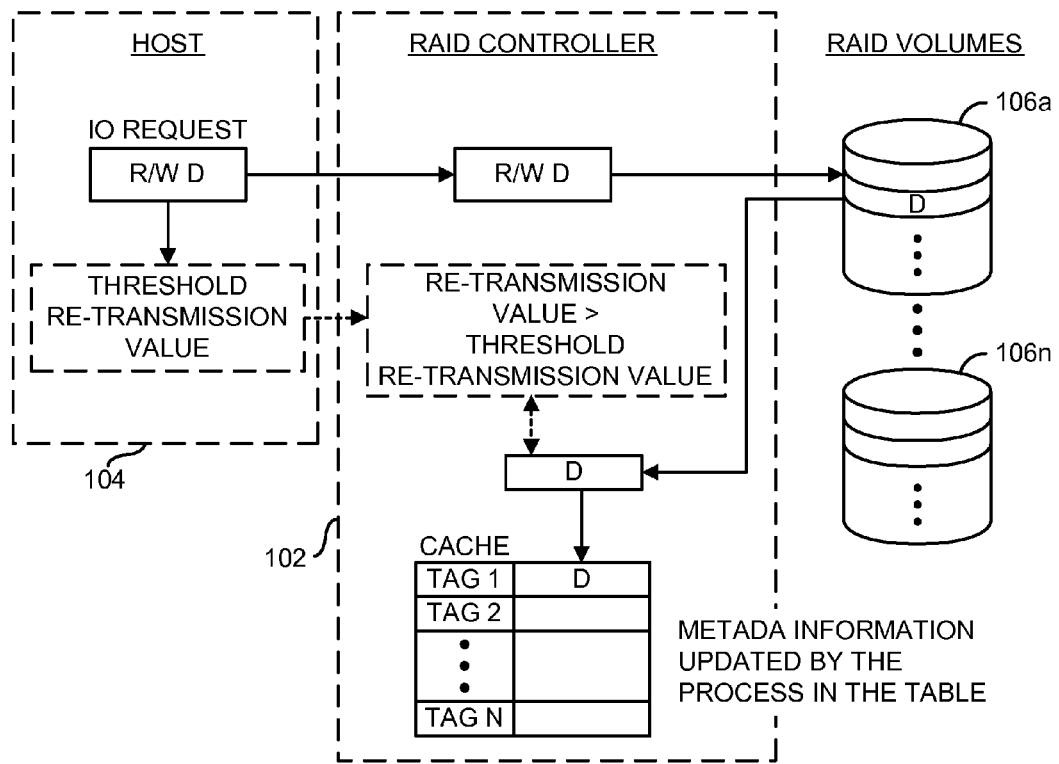
FIGS. 10A-B are diagrams illustrating data re-transmitted over a network.
Figure 10B:
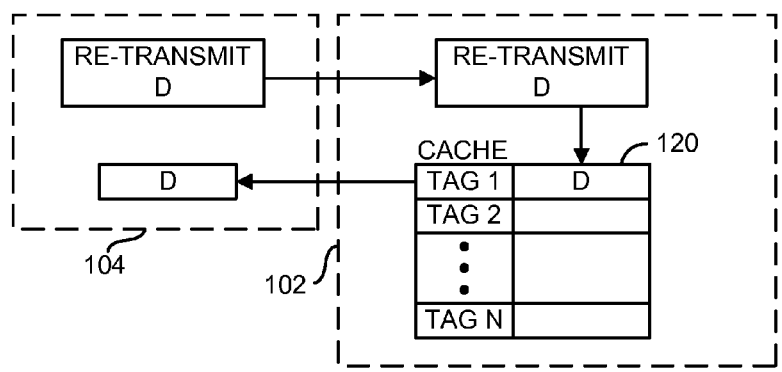

Referring to FIGS. 10A-B, data re-transmitted over the network due to data packet damage, packet drop, and/or network congestion related issues is shown. The Transmission Control Protocol (TCP) may start a re-transmission timer when each outbound data packet is handed down to the Internet Protocol (IP) layer. If the TCP does not receive an acknowledgment for the data before the timer expires, the data packet may be re-transmitted. The cache memory allocation module 130 may determine the threshold for the re-transmission value based on the network traffic, security policies agreed between host-array and/or probabilistic approach of packet loss over the particular network. As shown in FIG. 10A, if the re-transmission value for a data packet exceeds (as defined by the cache memory allocation module 130) the threshold value of re-transmission, the particular data packet may be tagged in the cache allocation table 120. As shown in FIG. 10B, the cache memory allocation table 120 may update metadata information and other components to serve subsequent re-transmission of the same data packet before the timer expires. The allocation of cache and/or storing the image onto cache generally follows the same data access patterns technique proposed in FIG. 5.

Figure 11:
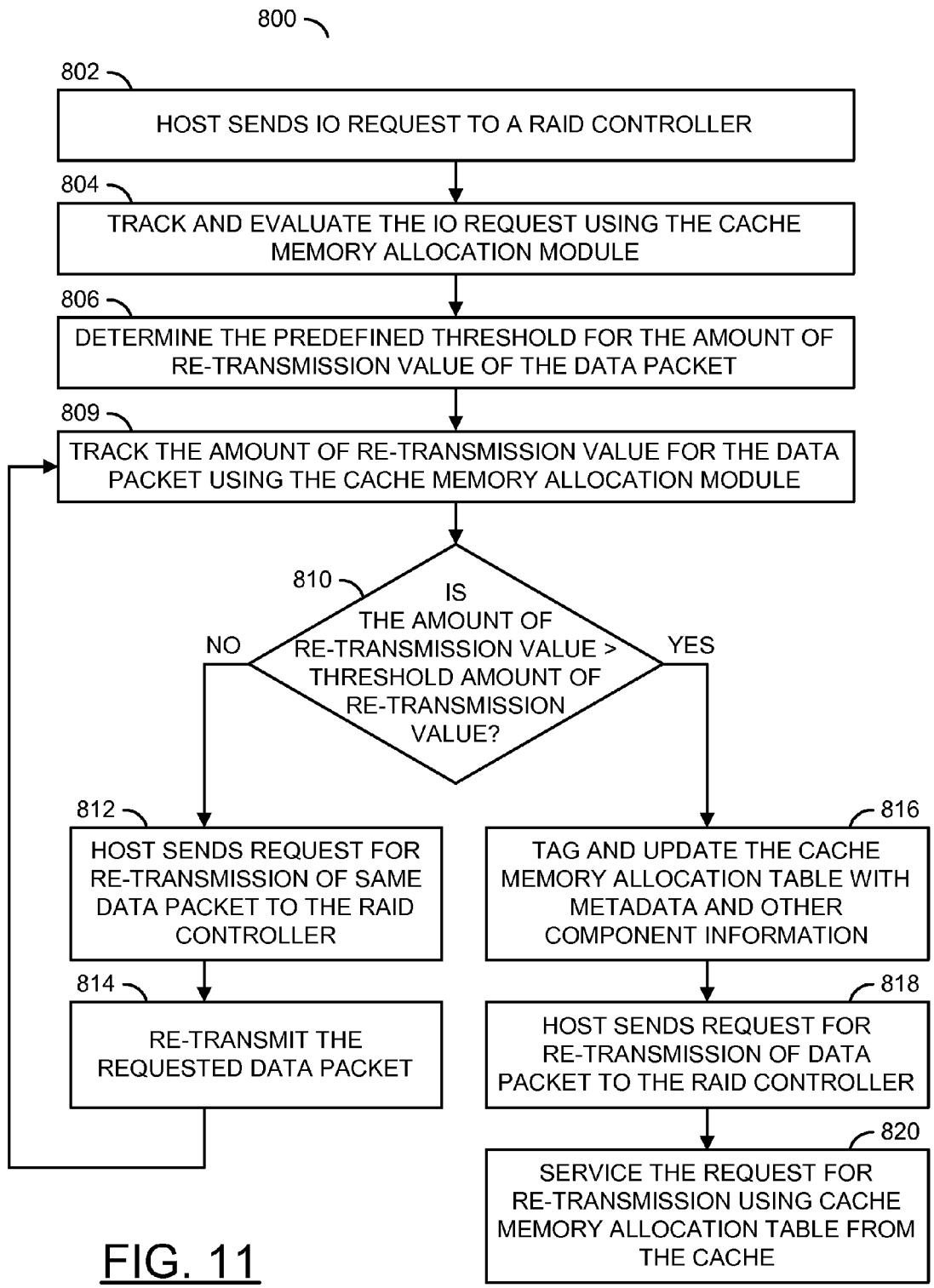
FIG. 11 is a flow diagram illustrating caching of data based on measurable parameters of a network.

Referring to FIG. 11, a diagram of a method (or process) 800 illustrating caching of data based on measurable parameters (such as amount of re-transmission value) of the network. The method 800 generally comprises a step (or state) 802, a step (or state) 804, a step (or state) 806, a step (or state) 808, a decision step (or state) 810, a step (or state) 812, a step (or state) 814, a step (or state) 816, a step (or state) 818 and a step (or state) 820.

In the step 802, one of the hosts 104a-104n may send an I/O request to the RAID controller 102. In step 804, the data packets accessed may be tracked and evaluated by the cache memory allocation module 130. In the step 806, the pre-defined threshold re-transmission value for the I/O request may be determined. In the step 808, the cache memory allocation module 130 may track the re-transmission value for the data packet. The step 810 may check whether the re-transmission value is greater than the threshold re-transmission value. If so, the step 816 may tag and update the cache memory allocation table 120 with metadata and/or other component information. At step 818, the host 104 may send a request for the re-transmission of the data packet. At the step 820, the request for re-transmission may be serviced using the cache memory allocation table 120. If not, the method 800 moves to the step 812. In the step 812, the host 104 may request a re-transmission of the data packet. At the step 814, the data packet may be fetched from the RAID volumes 106a-106n and re-transmitted to the host 104. The method 800 then moves back to the step 808.

The functions performed by the diagrams of FIGS. 5, 7, 9 and 11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a controller configured to store and/or retrieve data in response to one or more input/output requests;
   one or more host devices configured to present said input/output requests; and
   one or more storage devices configured to store and/or retrieve said data, wherein (i) said controller includes a cache memory configured to store said input/output requests, (ii) said cache memory is configured as a memory allocation table to store and/or retrieve a compressed version of a portion of said data in response to one or more network parameters and (iii) if a time needed to retrieve data from said memory allocation table is less than an average threshold round trip time, said compressed version of said portion of said data is retrieved from said memory allocation table instead of said storage devices based on said input/output requests to improve overall storage throughput.

2. The apparatus according to claim 1, wherein said compressed version is retrieved from said memory allocation table if said compressed version is available.

3. The apparatus according to claim 1, wherein said cache memory stores said input/output requests based on data access patterns.

4. The apparatus according to claim 1, wherein said network parameters include Transmission Control Protocol and the Internet Protocol (TCP/IP) network parameters.

5. The apparatus according to claim 1, wherein said one or more storage devices comprise a Redundant Array of Independent Disks (RAID).

6. The apparatus according to claim 1, wherein said input/output requests comprise metadata information.

7. The apparatus according to claim 6, wherein a dedicated application implemented on said controller maintains said metadata information based on a memory allocation process.

8. An apparatus comprising:
   means for storing and/or retrieving data in response to one or more input/output requests;
   means for presenting said input/output requests; and
   means for storing and/or retrieving said data, wherein (i) a cache memory is configured to store said input/output requests, (ii) said cache memory is configured as a memory allocation table to store and/or retrieve a compressed version of a portion of said data in response to one or more network parameters and (iii) if a time needed to retrieve data from said memory allocation table is less than an average threshold round trip time, said compressed version of said portion of said data is retrieved from said memory allocation table based on said input/output requests to improve overall storage throughput.

9. A method for implementing a cache memory allocation process, comprising the steps of:
   (A) storing and/or retrieving data in response to one or more input/output requests;
   (B) presenting said input/output requests;
   (C) storing and/or retrieving said data, wherein (i) a cache memory is configured to store said input/output requests, (ii) said cache memory is configured as a memory allocation table to store and/or retrieve a compressed version of a portion of said data in response to one or more network parameters and (iii) said compressed version of said portion of said data is retrieved from said memory allocation table based on said input/output requests to improve overall storage throughput;
   (D) determining if a round trip time of said data is greater than a predefined threshold round trip time; and
   (E) determining if a response time of said storing and/or receiving said data is greater than a predefined host timeout value.

10. The method according to claim 9, wherein said compressed version is retrieved from said memory allocation table if said compressed version is available.

11. The method according to claim 9, wherein said cache memory stores said input/output requests based on data access patterns.

12. The method according to claim 9, wherein said network parameters include Transmission Control Protocol and the Internet Protocol (TCP/IP) network parameters.

13. The method according to claim 9, wherein said input/output requests comprise metadata information.

14. The method according to claim 9, wherein said method further comprises the step of:
   determining if said data is accessed frequently.

15. The method according to claim 14, wherein said method further comprises the step of:
   assigning a tag to said data and updating said memory allocation table.

16. The method according to claim 15, wherein said method further comprises the step of:
   reserving said cache memory to a size equivalent to a fixed length of said data.

* * * * *